(12) United States Patent
Dobson et al.

(10) Patent No.: US 11,802,509 B2
(45) Date of Patent: Oct. 31, 2023

(54) AIR FILTRATION SYSTEM AND METHOD FOR COMPRESSOR BLEED VALVE

(71) Applicant: PRATT & WHITNEY CANADA CORP., Longueuil (CA)

(72) Inventors: Martin Dobson, Brossard (CA); Oleg Iskra, Oakville (CA); Michael Fryer, Oakville (CA); Marc Lavoie, Otterburn Park (CA); Ivan Sidorovich Paradiso, Toronto (CA); Louis Duranleau-Hendrickx, Montreal (CA); Domenico Di Florio, St-Lazare (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 140 days.

(21) Appl. No.: 17/358,196

(22) Filed: Jun. 25, 2021

(65) Prior Publication Data

US 2022/0412259 A1 Dec. 29, 2022

(51) Int. Cl.
*F02C 7/05* (2006.01)
*F02C 9/18* (2006.01)

(52) U.S. Cl.
CPC ............ *F02C 7/05* (2013.01); *F02C 9/18* (2013.01); *F05D 2220/323* (2013.01); *F05D 2260/607* (2013.01)

(58) Field of Classification Search
None
See application file for complete search history.

(56) References Cited

U.S. PATENT DOCUMENTS

| 6,152,978 | A  | * | 11/2000 | Lundquist | .......... B01D 39/2044 55/522 |
| 7,748,952 | B1 |   | 7/2010  | Schopf et al. | |
| 7,837,753 | B2 | * | 11/2010 | Roundy | .................. F02C 7/052 55/385.3 |
| 8,572,985 | B2 |   | 11/2013 | Waddleton | |

(Continued)

FOREIGN PATENT DOCUMENTS

| EP | 1750012 | 10/2014 |
| EP | 3626942 | 10/2021 |

(Continued)

OTHER PUBLICATIONS

European Patent Office, Communication re. extended European search report for European patent application No. 22180538.5, dated Mar. 22, 2023.

*Primary Examiner* — Kayla McCaffrey
(74) *Attorney, Agent, or Firm* — Norton Rose Fulbright Canada LLP

(57) ABSTRACT

Methods and systems for filtering pressurized air used to control a compressor bleed valve of a gas turbine engine are provided. One method comprises receiving the pressurized air in a conduit via an inlet of the conduit, releasing a first portion of the pressurized air out of the conduit via an outlet of the conduit, releasing a second portion of the pressurized air from the conduit via a port disposed between the inlet and the outlet of the conduit, directing the second portion of the pressurized air from the port to a filter along an upward flow path, filtering the second portion of the pressurized air using the filter, and directing the second portion of the pressurized air from the filter toward the compressor bleed valve.

14 Claims, 7 Drawing Sheets

(56) References Cited

U.S. PATENT DOCUMENTS

| | | | |
|---|---|---|---|
| 9,110,475 B2 * | 8/2015 | Simpson | ................ B64D 13/04 |
| 10,267,430 B2 | 4/2019 | Simpson | |
| 10,512,876 B2 | 12/2019 | Mercier et al. | |
| 10,824,172 B1 | 11/2020 | DeFelice et al. | |
| 11,008,889 B2 | 5/2021 | Ratzlaff et al. | |
| 11,008,979 B2 | 5/2021 | McCaffrey et al. | |
| 2008/0178571 A1 | 7/2008 | So et al. | |
| 2009/0139191 A1 | 6/2009 | Roundy | |
| 2010/0326090 A1 | 12/2010 | Waddleton | |
| 2014/0013767 A1 | 1/2014 | Bohney et al. | |
| 2014/0298788 A1 | 10/2014 | Blaney et al. | |
| 2014/0366965 A1 | 12/2014 | Simpson | |
| 2018/0340474 A1 | 11/2018 | Baladi et al. | |
| 2019/0309683 A1 | 10/2019 | Mackin et al. | |
| 2020/0025005 A1 | 1/2020 | Dunnigan et al. | |
| 2020/0284161 A1 | 9/2020 | Lefebvre et al. | |
| 2021/0246832 A1 | 8/2021 | Tu et al. | |

FOREIGN PATENT DOCUMENTS

| | | |
|---|---|---|
| FR | 3027973 | 5/2016 |
| JP | 2000104547 | 4/2000 |
| RU | 2109971 C1 | 4/1998 |

* cited by examiner

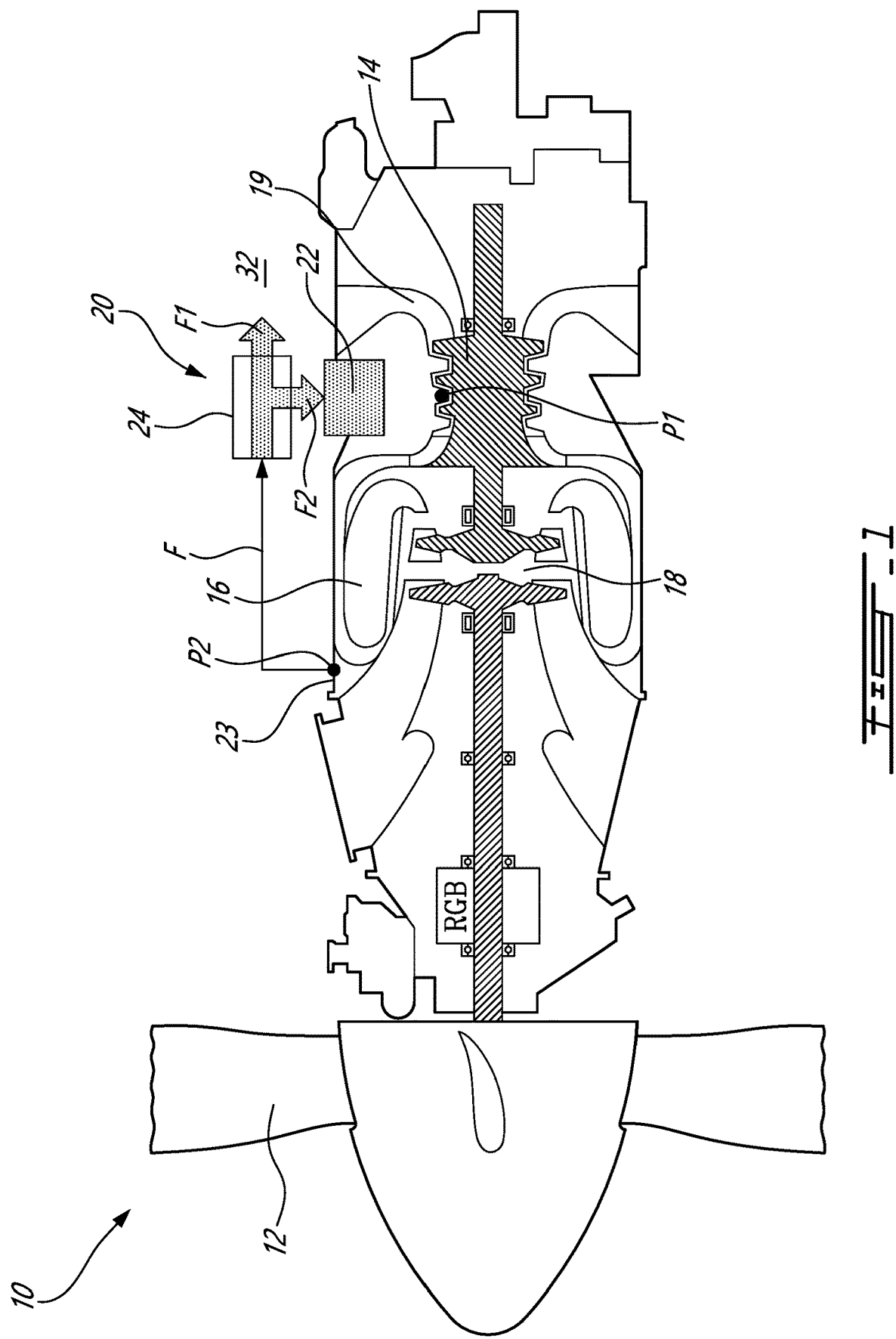

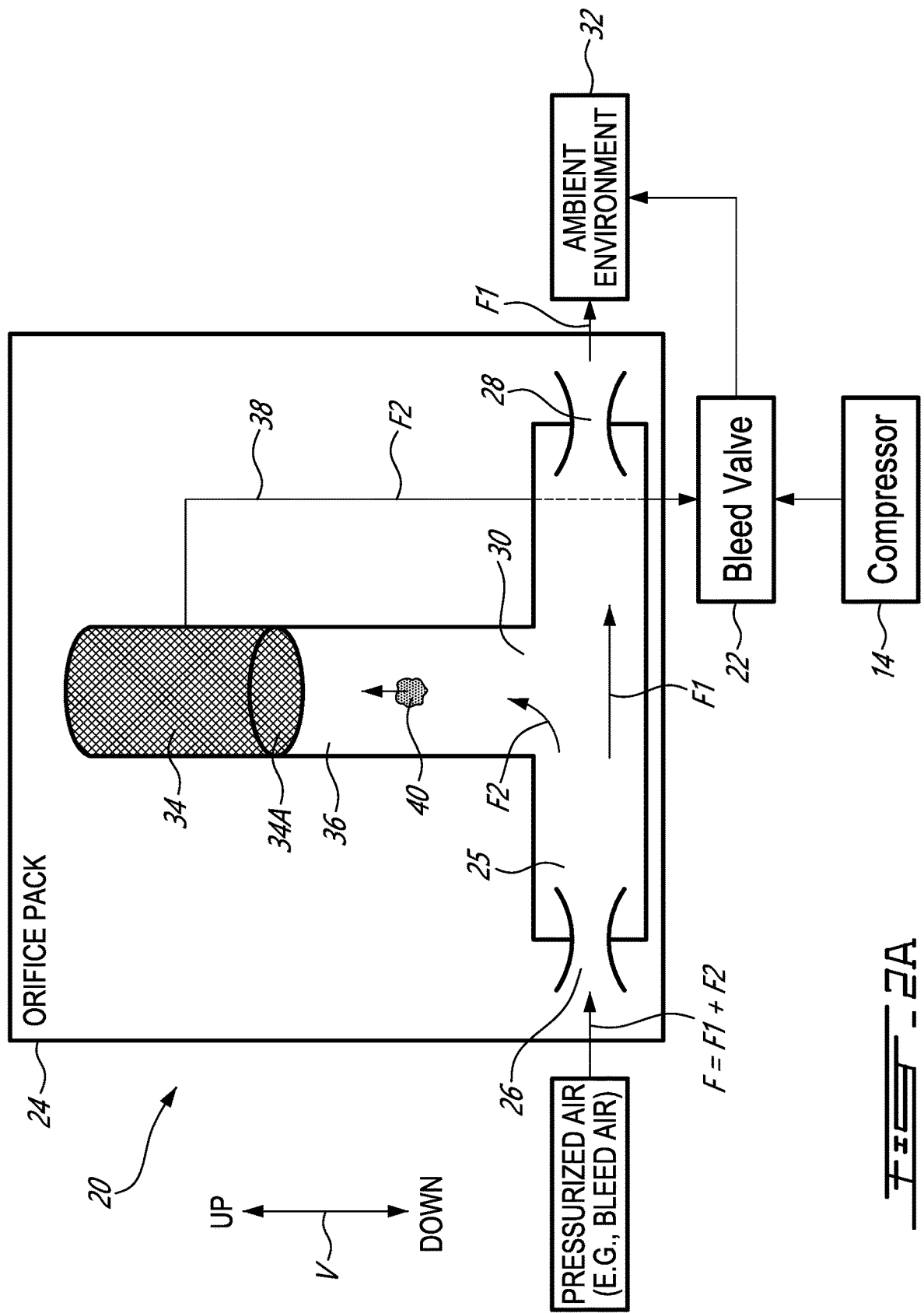

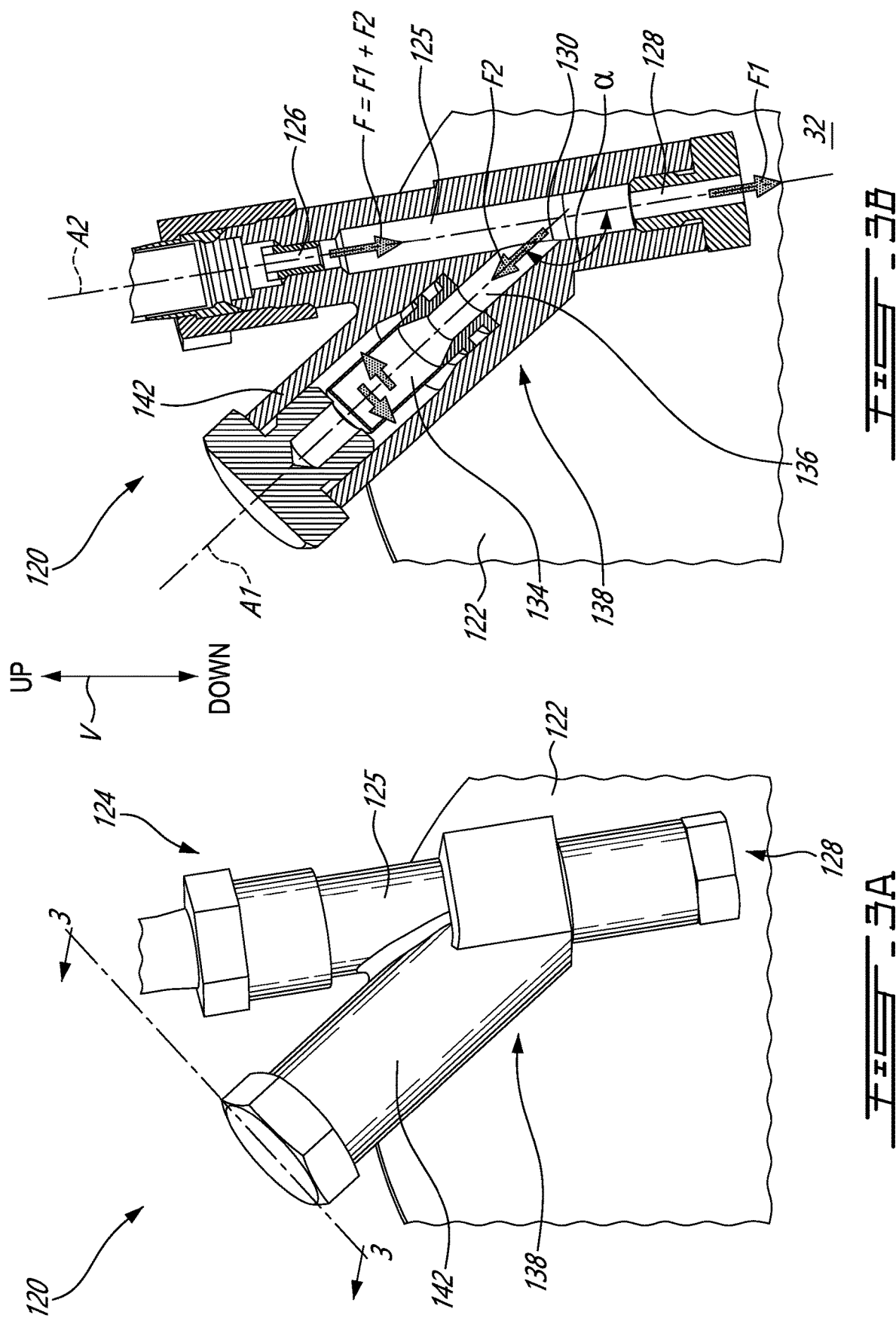

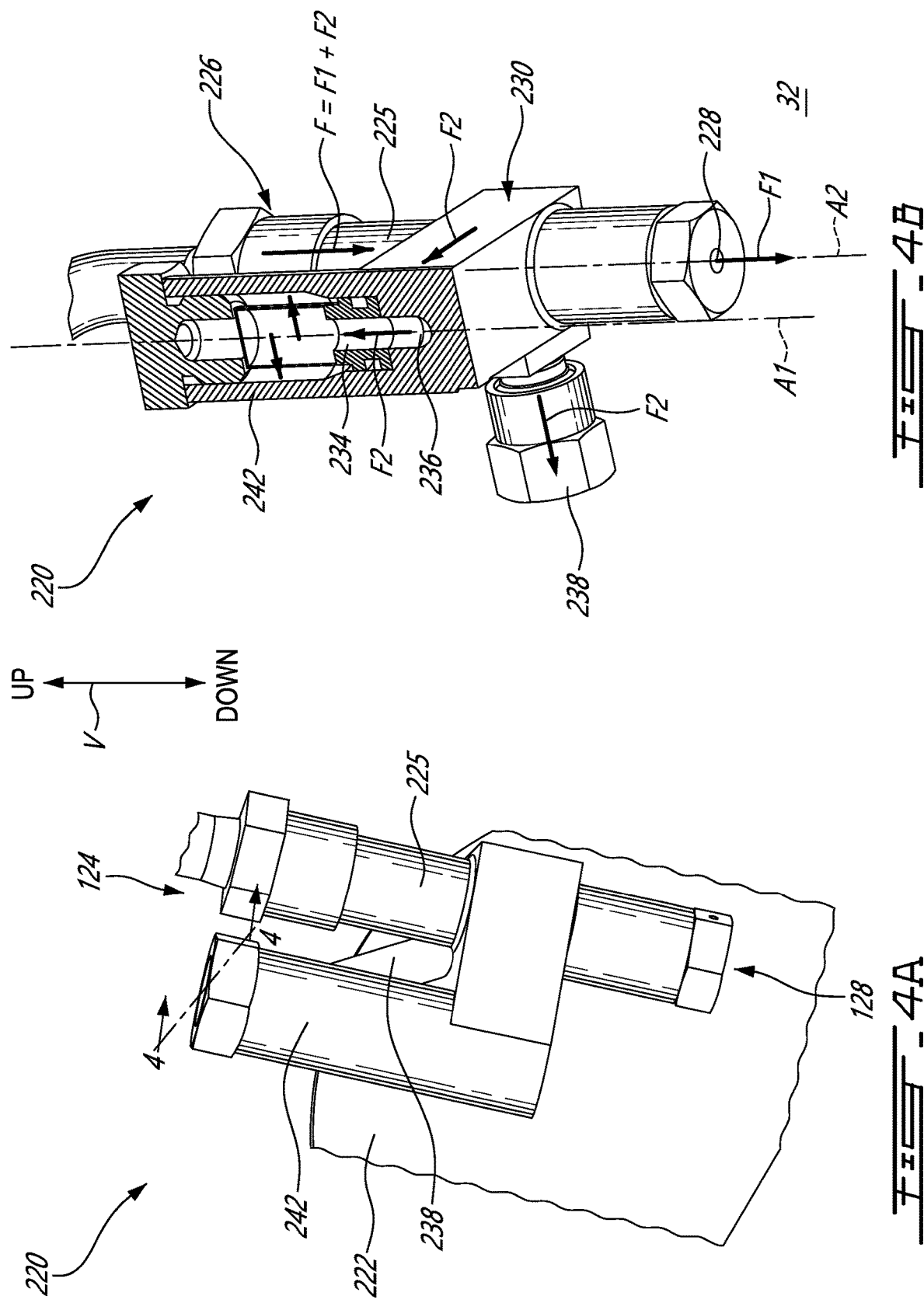

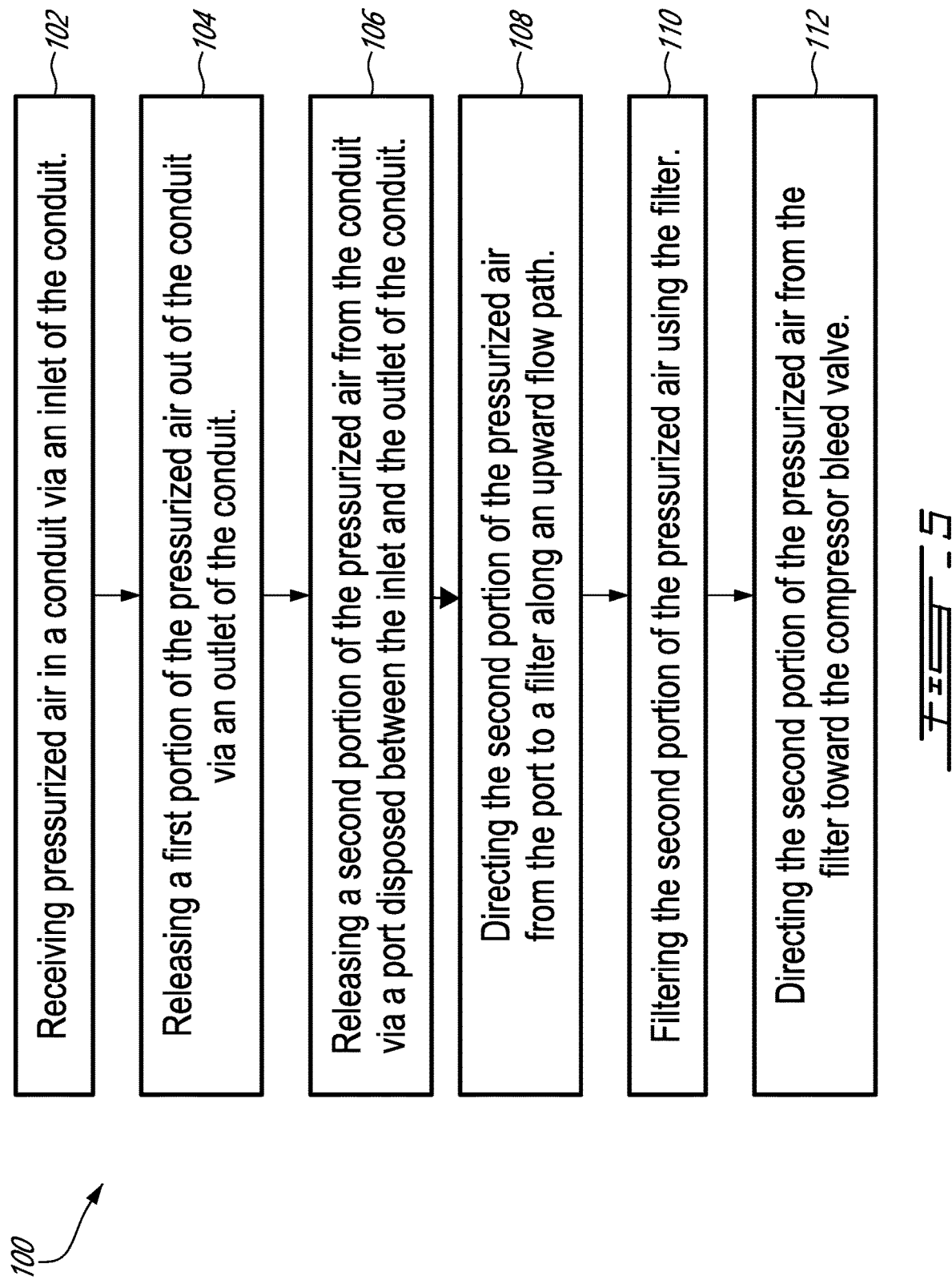

AIR FILTRATION SYSTEM AND METHOD FOR COMPRESSOR BLEED VALVE

TECHNICAL FIELD

The disclosure relates to gas turbine engines, and more particularly to compressor bleed valves of gas turbine engines.

BACKGROUND

In an aerospace gas turbine engine, pressurized air may be used as ""muscle air"" to control the operation of a pneumatically-operated compressor bleed valve that may be opened and closed to maintain the operability of the gas turbine engine. Depending on the operating conditions of the gas turbine engine and on the source of the pressurized air, some debris could potentially be carried by the pressurized air and the presence of such debris in the pressurized air delivered to the compressor bleed valve may not be desirable.

SUMMARY

In one aspect, the disclosure describes a method of filtering pressurized air used to control a compressor bleed valve of a gas turbine engine. The method comprises:
  receiving the pressurized air in a conduit via an inlet of the conduit;
  releasing a first portion of the pressurized air out of the conduit via an outlet of the conduit;
  releasing a second portion of the pressurized air from the conduit via a port disposed between the inlet and the outlet of the conduit;
  directing the second portion of the pressurized air from the port to a filter along an upward flow path;
  filtering the second portion of the pressurized air using the filter; and
  directing the second portion of the pressurized air from the filter toward the compressor bleed valve.

In another aspect, the disclosure describes a gas turbine engine system for filtering pressurized air used to control a compressor bleed valve of a gas turbine engine. The gas turbine engine system comprises:
  a first conduit including: an inlet for receiving the pressurized air; an outlet for releasing a first portion of the pressurized air from the first conduit; and a port for releasing a second portion of the pressurized air from the first conduit, the port being disposed between the inlet and the outlet;
  a filter for filtering the second portion of the pressurized air, the filter being in fluid communication with the conduit via the port and an upward flow path from the port to the filter; and
  a second conduit in fluid communication with the filter and disposed to direct the second portion of the pressurized air from the filter toward the compressor bleed valve.

In a further aspect, the disclosure describes a gas turbine engine comprising:
  a compressor for pressurizing air;
  a combustor in which the pressurized air is mixed with fuel and ignited for generating a stream of combustion gas;
  a turbine for extracting energy from the combustion gas, the compressor, the combustor and the turbine being operatively disposed along a gas path of the gas turbine engine;
  a pneumatically-operable compressor bleed valve for bleeding pressurized air from the compressor; and
  an orifice pack for controlling an operation of the compressor bleed valve, the orifice pack including:
    a first conduit including:
      an inlet orifice for receiving a quantity of bleed air extracted from the gas path downstream of the compressor bleed valve and upstream of the combustor, the inlet orifice defining a first constriction;
      an outlet orifice for releasing a first portion of the bleed air from the first conduit, the outlet orifice defining a second constriction; and
      a port for releasing a second portion of the bleed air from the first conduit, the port being disposed between the inlet orifice and the outlet orifice;
    a filter for filtering the second portion of the bleed air, the filter being in fluid communication with the conduit via the port and an upward flow path between the port to the filter; and
    a second conduit in fluid communication with the filter and disposed to direct the second portion of the bleed air from the filter toward the compressor bleed valve.

Further details of these and other aspects of the subject matter of this application will be apparent from the detailed description included below and the drawings.

DESCRIPTION OF THE DRAWINGS

Reference is now made to the accompanying drawings, in which:

FIG. 1 is a schematic axial cross-sectional view of an exemplary gas turbine engine including a system for filtering pressurized air used to control a compressor bleed valve of the gas turbine engine, as described herein;

FIGS. 2A-2C are schematic representations of an exemplary system for filtering the pressurized air used to control the compressor bleed valve in different modes of operation;

FIG. 3A is a perspective view of another exemplary system for filtering the pressurized air used to control the compressor bleed valve;

FIG. 3B is a cross-sectional view of the system of FIG. 3A taken along line 3-3 in FIG. 3A;

FIG. 4A is a perspective view of another exemplary system for filtering the pressurized air used to control the compressor bleed valve;

FIG. 4B is a cross-sectional view of the system of FIG. 4A taken along line 4-4 in FIG. 4A; and FIG. 5 is a flowchart of an exemplary method for filtering pressurized air used to control a compressor bleed valve of a gas turbine engine.

DETAILED DESCRIPTION

Figure 2B:
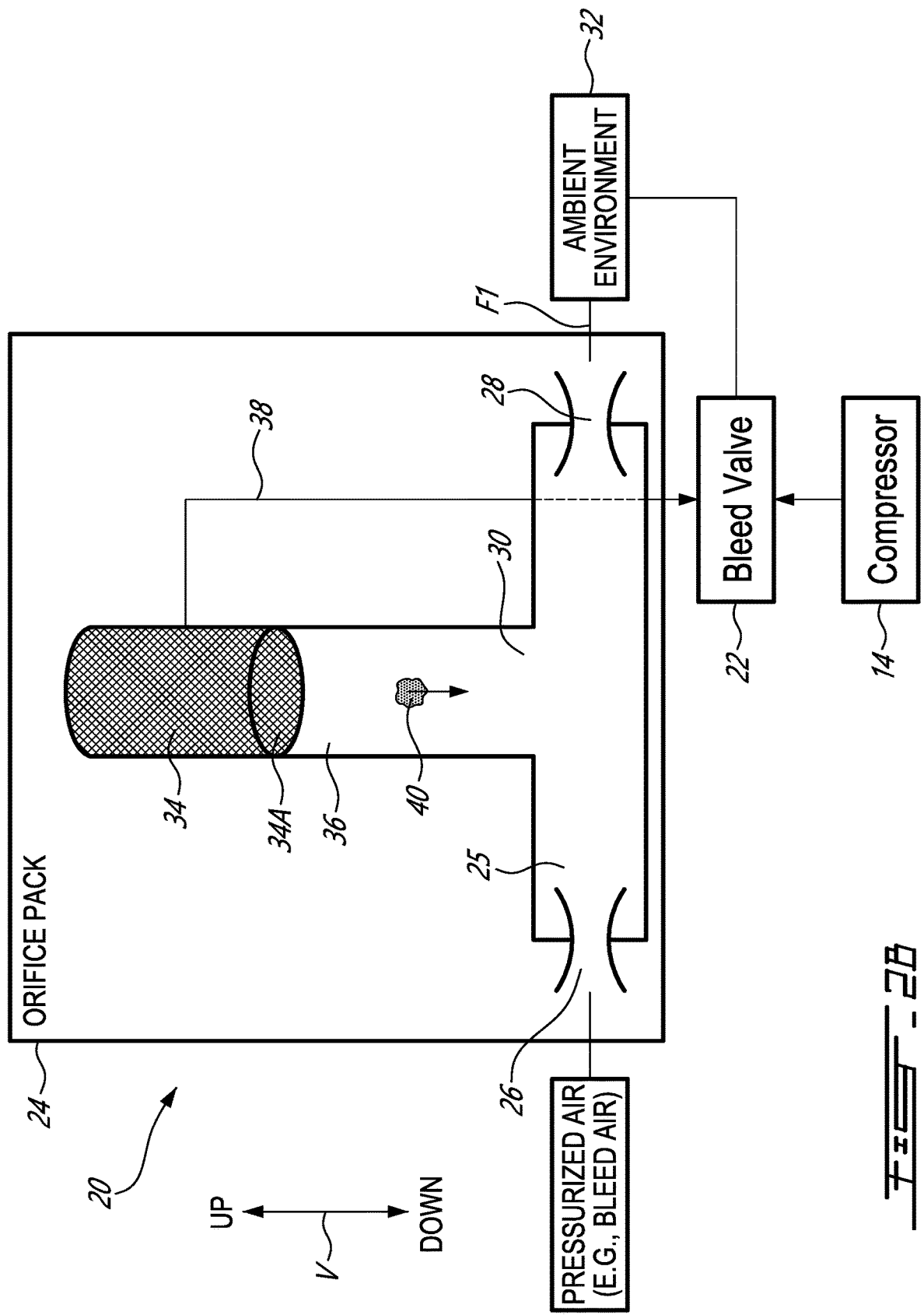

The following description discloses systems and methods for filtering pressurized air used to control a pneumatically-operated compressor bleed valve of a gas turbine engine. In some situations, filtering the pressurized air upstream of the compressor bleed valve may prevent some of the debris carried by the pressurized air from being delivered to the compressor bleed valve. In some situations, filtering the pressurized air may promote reliability and consistency in the operation of the compressor bleed valve. In some embodiments, the filter may be disposed to encourage self-cleaning of the filter, which may reduce the need for maintenance or replacement of the filter. For example, the filter may be configured to encourage debris captured by the filter to be released from the filter and discharged to the ambient environment.

The term ""connected"" may include both direct connection (in which two elements contact each other) and indirect connection (in which at least one additional element is located between the two elements).

The term "substantially" as used herein may be applied to modify any quantitative representation which could permissibly vary without resulting in a change in the basic function to which it is related.

Aspects of various embodiments are described through reference to the drawings.

FIG. 1 illustrates an exemplary gas turbine engine 10 (referred hereinafter as "engine 10"), which may be of a type preferably provided for use in subsonic flight of an aircraft. Engine 10 may comprise, in serial flow communication, propeller 12 through which ambient air is propelled, compressor 14 for pressurizing the air, combustor 16 in which the compressed air is mixed with fuel and ignited for generating an annular stream of hot combustion gases, and turbine section 18 including one or more turbines for extracting energy from the combustion gases. Compressor 14 of engine 10 may be a multi-stage compressor, and thus may comprise a plurality of axial and/or centrifugal compressor stages. Compressor 14, combustor 16 and turbine section 18 may be operatively disposed along gas path 19 of engine 10. In some embodiments, engine 10 may be a reverse-flow turboprop gas turbine engine. Even though FIG. 1 illustrates a turboprop engine, it is understood that the systems and methods described herein may be incorporated into other types of gas turbine engines including engines of the turbofan and turboshaft type. It is also understood that the systems and methods described herein may be incorporated into aircraft and ground-based gas turbine engine applications.

Engine 10 may include system 20 for filtering pressurized air that is used as "muscle air" to control a function of compressor bleed valve 22 (referred hereinafter as "bleed valve 22") of engine 10. Bleed valve 22 may be pneumatically-operated and may be opened to release air from compressor 14 to ambient environment 32. Bleed valve 22 may be opened to relieve pressure in a portion of gas path 19 at a stage of compressor 14. Bleed valve 22 may be a poppet valve having a hole, usually round or oval and a tapered plug, usually a disk shape on the end of a shaft. The shaft may guide the plug portion by sliding through a valve guide. A pressure differential may be used to seal the valve and, under certain operating conditions, open the valve. In some embodiments, bleed valve 22 may be similar to the type of air bleed valve disclosed in U.S. Pat. No. 8,572,985 B2 (titled: AIR FILTRATION SYSTEM FOR GAS TURBINE ENGINE PNEUMATIC SYSTEM), which is incorporated herein by reference. System 20 may receive pressurized air from gas generator casing 23 of engine 10 and may distribute the pressurized air between bleed valve 22 and ambient environment 32 as explained below.

The function of bleed valve 22 may be controlled by forces acting on opposite sides of bleed valve 22 which may relate to the respective air pressures P1, P2 at different locations along gas path 19. In some embodiments of bleed valve 22, a spring may be provided to bias bleed valve 22 toward the open or closed position. In reference to FIG. 1, pressure P1 may be taken in gas path 19 at an intermediate stage of compressor 14, and P2 may be taken in gas path 19 downstream of the location of P1. For example, pressure P2 may be taken downstream of compressor 14 and upstream of combustor 16 so that pressure P2 may be higher than pressure P1. Pressure P2, or another pressure indicative thereof, may be acquired via bleed air taken from gas path 19 at the desired location along gas path 19. The bleed air may be delivered to bleed valve 22 via orifice pack 24. In some embodiments, pressure P2 may be taken at a location along gas path 19 providing the highest pressure within engine 10. Changes in the P1/P2 pressure relationship may cause bleed valve 22 to move between the open and closed positions. During operation of engine 10, bleed valve 22 may be controlled by P1/P2 to maintain the operability of engine 10. In some situations, bleed valve 22 may, for example, prevent compressor stall at relatively low operating speeds of engine 10.

FIG. 2 is a schematic view of an exemplary system 20. System 20 may include first conduit 25 including inlet 26 for receiving the pressurized (e.g., bleed) air F, outlet 28 for releasing a first portion F1 of pressurized air F from first conduit 25, and port 30 for releasing a second portion F2 of pressurized air from first conduit 25. First portion F1 and second portion F2 of pressurized air F may be different from each other so that F=F1+F2. Port 30 may be disposed between inlet 26 and outlet 28. In some embodiments, first conduit 25 may define a diffusion chamber between inlet 26 and outlet 28. The diffusion chamber of first conduit 25 may have a cylindrical configuration. Port 30 may be formed in a wall of the diffusion chamber defined by first conduit 25.

In some embodiments, inlet 26 may include an inlet orifice defining a constriction (i.e., narrowing or reduced cross-sectional area of the available flow passage) relative to at least part of first conduit 25. In some embodiments, outlet 28 may similarly include an outlet orifice defining a constriction relative to at least part of first conduit 25. In some embodiments, the inlet orifice and the outlet orifice may be sized to provide a desired flow rate and pressure drop across each of the inlet orifice and the outlet orifice. Such sizing may be based on specific operating parameters of engine 10 and the desired operating behaviour of bleed valve 22. In some embodiments, the inlet orifice and/or the inlet orifice may be configured as replaceable inserts to facilitate the use of orifice packs of similar configurations on different engines.

System 20 may include filter 34 for filtering second portion F2 of pressurized air F. Filter 34 may be in fluid communication with first conduit 25 via port 30 and an upward flow path 36 extending upwardly from port 30 to filter 34. In various embodiments, upward flow path 36 may be shorter or longer and may include an interior of filter 34 where filter 34 has a cylindrical configuration for example.

System 20 may include second conduit 38 in fluid communication with filter 34 and disposed to direct second portion F2 of pressurized air F from filter 34 to bleed valve 22 after second portion F2 of pressurized air F has passed through filter 34. In some embodiments, first conduit 25, filter 34 and second conduit 38 may be integrated into orifice pack 24 which may include an assembly of components integrated as a module operatively connectable to bleed valve 22. In some embodiments, part(s) (e.g., first conduit 25 and second conduit 38) of orifice pack 24 may be machined from a block of metallic material and filter 34 may be removably installed at the desired location. In some embodiments, orifice pack 24 may be a line replaceable unit. First conduit 25 and second conduit 38 may be constructed from suitable tubing, pipe or channel made from suitable metallic or other material(s). In some embodiments, upward flow path 36 may be defined by a suitable conduit of similar or other construction.

During operation of system 20, pressurized air F may be received into first conduit 25 via inlet 26. First portion F1 of pressurized air F may be released out of first conduit 25 via outlet 28 of first conduit 25. Second portion F2 of pressurized air F may be released from first conduit 25 via port 30 disposed between inlet 26 and outlet 28 relative to a streamwise direction along first conduit 25. Second portion F2 of pressurized air F may be used as control (i.e., muscle) air for controlling the operation of bleed valve 22. Second portion F2 of pressurized air F may be directed toward filter 34 along upward flow path 36 from port 30 to filter 34. In some embodiments, port 30 may be disposed on an upper or lateral side of first conduit 25. Second portion F2 of pressurized air F may pass through filter 34 and consequently be filtered by filter 34. After filtering, second portion F2 of pressurized air F may be directed toward bleed valve 22 to control the operation of bleed valve 22. In some situations, second portion F2 of pressurized air F may cause bleed valve 22 to open and to release some air from compressor 14 to ambient environment 32 to prevent compressor stall for example.

FIG. 2A illustrates a mode of operation where engine 10 is operative and pressurized air F is being supplied to first conduit 25 via inlet 26. During this mode of operation, first portion F1 of pressurized air F may be greater than second portion F2 of pressurized air F. In some embodiments, first portion F1 of pressurized air F may be significantly greater than second portion F2 of pressurized air F. In some embodiments and situations, first portion F1 may represent about 98% of pressurized air F, and second portion F2 may represent about 2% of pressurized air F. FIG. 2A also shows a piece of debris 40 that could potentially find its way into first conduit 25 and be carried into upward flow path 36 by second portion F2 of pressurized air F. It is expected that debris 40 would be captured by filter 34 and prevented from reaching bleed valve 22 via second conduit 38. Debris 40 could include a piece of sand or other foreign object that may be ingested by engine 10 for example.

In some embodiments, filter 34 may have a cylindrical shape where second portion F2 of pressurized air F is received into a central inner cavity of filter 34, passes through filter 34 in radially outward directions, and is then directed to bleed valve 22 via second conduit 38. Filter 34 may be cup-shaped or configured as a canister having opening 34A for receiving second portion F2 of pressurized air F and debris 40 entrained therewith. Opening 34A may be disposed downwardly to accommodate upward flow path 36 and also allow debris 40 collected in the internal cavity of filter 34 to fall out of filter 34 by the influence of gravity when engine 10 is shut down and the flow of pressurized air F into first conduit 25 is ceased or reduced as explained further below.

Vertical axis V is shown in FIG. 2A relative to the orientation of system 20 when installed in engine 10. Vertical axis V shows the UP and DOWN directions. Even though upward flow path 36 is illustrated as being wholly vertical and upward from port 30 to opening 34A of filter 34, it is understood that upward flow path 36 may be oriented at a non-zero angle from the vertical axis V. For example, upward flow path 36 may be oriented at an oblique angle to vertical axis V while still providing an upward flow path 36 from port 30 to filter 34. In some embodiments, upward flow path 36 may include the internal cavity of filter 34. In various embodiments, first conduit 25 may be oriented generally horizontally, vertically, or at an oblique angle from vertical axis V.

In some embodiments, filter 34 may be disc-shaped or may have other suitable configurations. The filtering medium of filter 34 may be a metallic mesh but other types of filtering media may also be suitable. In some embodiments, filter 34 may include a relatively fine mesh capable of filtering debris 40 as small as 10 microns in size for example.

FIG. 2B illustrates another mode of operation of system 20 where engine 10 is shut down and pressurized air F is no longer being supplied to first conduit 25 via inlet 26. During this mode of operation, second portion F2 of pressurized air F may no longer be keeping debris 40 against an intake side of filter 34 and, in some situations, debris 40 may become dislodged from filter 34 and gravity may cause debris 40 to fall out of opening 34A, downwardly along upward flow path 36 and enter first conduit 25 via port 30. FIG. 2B shows debris 40 in upward flow path 36 and falling downwardly toward first conduit 25.

Figure 2C:
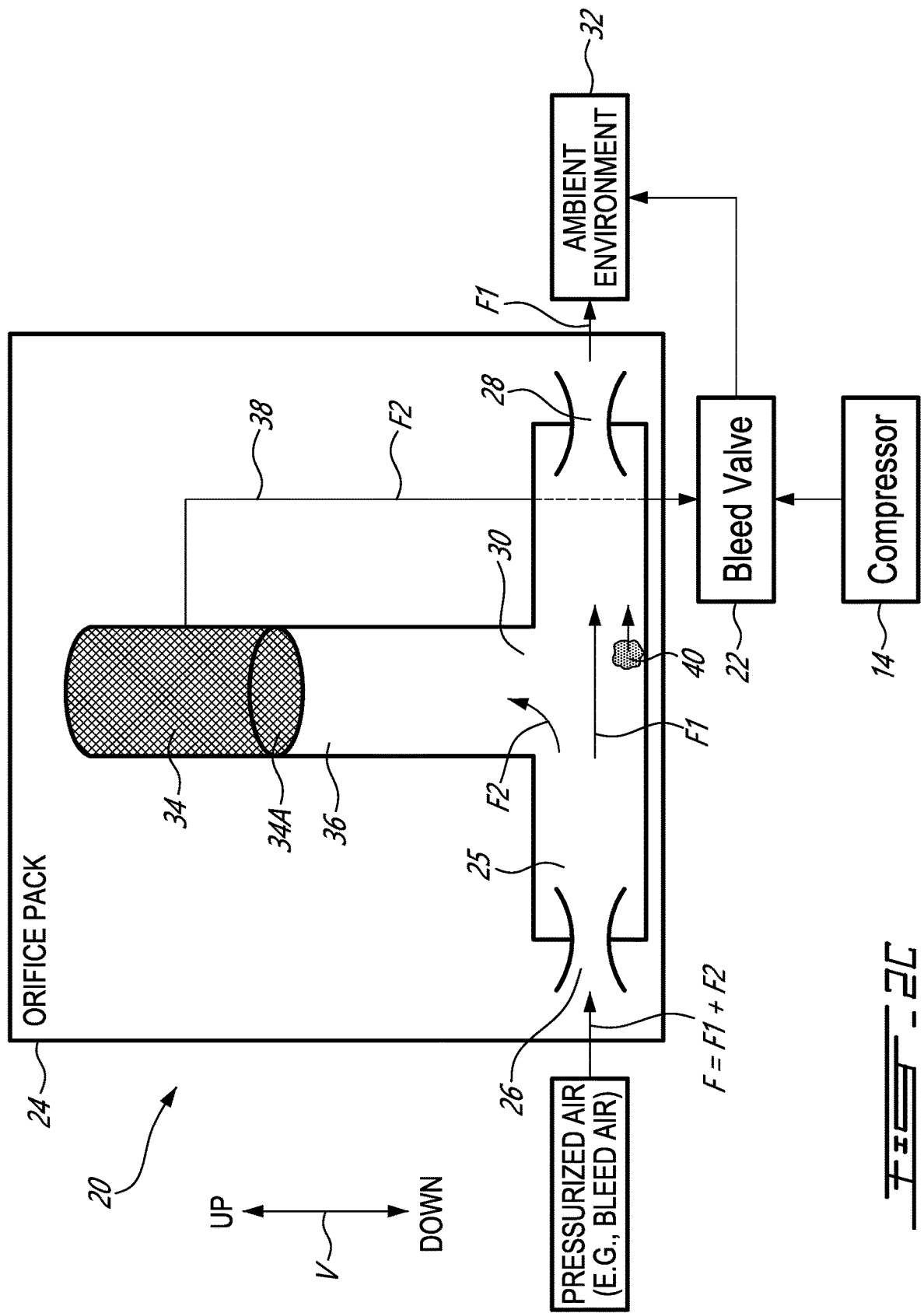

FIG. 2C illustrates another mode of operation where engine 10 is restarted after being shut down as shown in FIG. 2B. In this mode of operation, the supply of pressurized air F to first conduit 25 via inlet 26 is resumed. Since debris 40 has fallen into first conduit 25, the flow of first portion F1 of pressurized air F may entrain debris 40 toward outlet 28 and cause debris 40 to be discharged from first conduit 25. Hence the configuration of filter 34, upward flow path 36 and first conduit 25 may promote self cleaning of filter 34 and reduce the need for maintenance or replacement of filter 34 in some situations. It is understood that the arrangement illustrated herein may not cause all debris to be removed from filter 34 and that some maintenance or replacement of filter 34 may still be required in some situations.

FIG. 3A is a perspective view of another exemplary system 120 for filtering pressurized air used to control bleed valve 122. FIG. 3B is a cross-sectional view of system 120 taken along line 3-3 in FIG. 3A. System 120 may include components of system 20 described above. In relation to system 20, like elements have been identified using reference numerals that have been incremented by 100.

In some embodiments, first conduit 125 may be oriented to promote downward flow of first portion F1 of pressurized air F and consequently promote the expulsion of debris 40 shown in FIGS. 2A-2C to ambient environment 32. Accordingly, outlet 128 of first conduit 125 may be lower than inlet 126 of first conduit 125 relative to vertical axis V.

In various embodiments, upward flow path 136 extending from port 130 to filter 134 may be defined by a single linear segment or by two or more linear segments as shown in FIGS. 4A, 4B. It is understood that upward flow path 136 may be curved, or may include a combination of one or more linear segments (e.g., at non-zero angles of each other) and one or more curved segments. In various embodiments, upward flow path 136 may provide a downward path for debris 40 to fall back into first conduit 125 when engine 10 is shut down or the flow of pressurized air F into first conduit 125 is otherwise reduced or stopped.

In some embodiments where filter 134 has a cylindrical configuration, filter 34 may have an axis A1 of revolution oriented obliquely to a longitudinal axis A2 of first conduit 125 by angle $\alpha$. Filter 134 may be disposed inside filter housing 142. In some embodiments, first conduit 125 may be generally linear but may instead include one or more curved segments. In some embodiments, filter 134 and upward flow path 136 may be substantially coaxial. In some embodiments, port 130 may be disposed on a lateral side of first conduit 125. In reference to FIGS. 3A and 3B, second conduit 138 providing fluid communication between filter 134 and bleed valve 122 is disposed behind other structure of system 120 and is not visible.

The orientation of first conduit 125 depicted where outlet 128 is lower than inlet 126 and/or where angle $\alpha$ is obtuse may discourage debris 40 from entering upward flow path 136 due to the influence of gravity, the inertia of debris 40 flowing downwardly along first conduit 125, and the magnitude of the change in course required by debris 40 to enter upward flow path 136. The orientation of upward flow path 136 relative to first conduit 125 may require debris 40 to change course by an obtuse angle α in order to enter upward flow path 136. In other words, the general flow direction of pressurized air F (i.e., F1+F2) or of first portion F1 in first conduit 125 and the general flow direction of second portion F2 of pressurized air F in upward flow path 136 may be at an obtuse angle α of each other. In some embodiments, obtuse angle α may be equal to or greater than 135° for example. In some embodiments, obtuse angle α may be between 135° and 180° for example.

FIG. 4A is a perspective view of another exemplary system 220 for filtering pressurized air used to control bleed valve 222. FIG. 4B is a cross-sectional view of system 220 taken along line 4-4 in FIG. 4A. System 220 may include components of systems 20, 120 described above. In relation to system 20, like elements have been identified using reference numerals that have been incremented by 200.

In reference to FIGS. 4A and 4B, part of second conduit 238 providing fluid communication between filter 234 and bleed valve 222 is disposed behind other structure of system 220 and is only partially visible. First conduit 225 of system 220 may be substantially identical or similar to first conduit 125 of system 120. In contrast with system 120, system 220 may be configured so that axis A1 of revolution of filter 234 may be substantially parallel to longitudinal axis A2 of first conduit 225. Filter 234 may be disposed inside filter housing 242. A seal may be formed between filter housing 242 and filter 234 using a suitable (e.g., high-temperature) packing material.

Upward flow path 236 may comprise one or more linear segments providing fluid communication between filter 234 and first conduit 225. The one or more segments of upward flow path 236 may each have an upward orientation relative to a streamwise direction of second portion F2 of pressurized air F. For example, upward flow path 236 may include a first segment extending from port 230 defined in first conduit 225 and extending transversely to longitudinal axis A2 of first conduit 225. Upward flow path 236 may include a subsequent segment extending substantially coaxially with axis A1 of revolution of filter 234. Similarly to systems 20 and 120, upward flow path 236 may provide a downward path for debris 40 to fall from filter 254 and into first conduit 225 when engine 10 is shut down so that debris 40 may later be expelled via outlet 228.

FIG. 5 is a flowchart illustrating an exemplary method 100 for filtering pressurized air used to control bleed valve 22 of engine 10. Method 100 may be used with any one of systems 20, 120, 220 or with other system(s). Method 100 may be combined with steps or aspect of other methods described herein. Aspects of systems 20, 120, 220 may be incorporated into method 100. In various embodiments, method 100 may include:

receiving pressurized air F in first conduit 25, 125, 225 via inlet 26, 126, 226 of first conduit 25, 125, 225 (block 102);

releasing first portion F1 of pressurized air F out of first conduit 25, 125, 225 via outlet 28, 128, 228 of first conduit 25, 125, 225 (block 104);

releasing second portion F2 of pressurized air F from first conduit 25, 125, 225 via port 30, 130, 230 disposed between inlet 26, 126, 226 and outlet 28, 128, 228 of first conduit 25, 125, 225 (block 106);

directing second portion F2 of pressurized air F toward filter 34, 134, 234 along upward flow path 36, 136, 236 extending from port 30, 130, 230 to filter 34, 134, 234 (block 108);

filtering second portion F2 of pressurized air F using filter 34, 134, 234 (block 110); and directing second portion F2 of pressurized air F toward compressor bleed valve 22, 122, 222 (block 112).

Filtering second portion F2 of pressurized air F using filter 34, 134, 234 may include collecting debris 40 at filter 34, 134, 234. Method 100 may include ceasing to receive pressurized air F in first conduit 25, 125, 225 via inlet 26, 126, 226. This may occur when engine 10 is shut down or the flow of pressurized air F to first conduit 25, 125, 225 is switched off for example. As shown in FIG. 2B as an example, method 100 may include receiving debris 40 collected at filter 34, 134, 234 into first conduit 25, 125, 225 via upward flow path 36, 136, 236 and port 30, 130, 230.

After receiving debris 40 into first conduit 25, 125, 225, method 100 may include restarting to receive pressurized air F in first conduit 25, 125, 225 via inlet 26, 126, 226. This may occur when engine 10 is restarted after a period of shutdown or the flow of pressurized air F to first conduit 25, 125, 225 is switched on for example. As shown in FIG. 2C, method 100 may include discharging debris 40 from first conduit 25, 125, 225 via outlet 28, 128, 228 of first conduit 25, 125, 225.

Discharging debris 40 from first conduit 25, 125, 225 via outlet 28, 128, 228 of first conduit 25, 125, 225 may include entraining debris 40 out of first conduit 25, 125, 225 using first portion F1 of pressurized air F.

First portion F1 of pressurized air F may be greater than second portion F2 of pressurized air F.

Upward flow path 36, 136, 236 extending from port 30, 130, 230 to filter 34, 134, 234 may include one or more linear segments and/or one or more curved segments.

Filter 34, 134, 234 may have a cylindrical configuration. Filtering second portion F2 of pressurized air F using filter 34, 134, 234 may include collecting debris 40 inside filter 34, 134, 234. Method 100 may include ceasing to receive pressurized air F in first conduit 25, 125, 225 via inlet 26, 126, 226. Method 100 may include receiving debris 40 collected inside filter 34, 134, 234 into first conduit 25, 125, 225 via upward flow path 36, 136, 236 and port 30, 130, 230.

In some embodiments of method 100, a general flow direction of pressurized air F in first conduit 25, 125, 225 and a general flow direction of second portion F2 of pressurized air F in upward flow path 36, 136, 236 may be at an obtuse angle of each other.

The embodiments described in this document provide non-limiting examples of possible implementations of the present technology. Upon review of the present disclosure, a person of ordinary skill in the art will recognize that changes may be made to the embodiments described herein without departing from the scope of the present technology. Further modifications could be implemented by a person of ordinary skill in the art in view of the present disclosure, which modifications would be within the scope of the present technology.

What is claimed is:

1. A method of filtering pressurized air used to control a compressor bleed valve of a gas turbine engine, the method comprising:

receiving the pressurized air in a conduit via an inlet of the conduit;

releasing a first portion of the pressurized air out of the conduit via an outlet of the conduit;

releasing a second portion of the pressurized air from the conduit via a port disposed between the inlet and the outlet of the conduit;

directing the second portion of the pressurized air from the port to a filter along an upward flow path;
filtering the second portion of the pressurized air using the filter; and
directing the second portion of the pressurized air from the filter toward the compressor bleed valve;
wherein:
the filter has a cylindrical configuration;
the conduit is substantially linear and has a longitudinal axis;
the filter has an axis of revolution oriented obliquely to the longitudinal axis of the conduit;
filtering the second portion of the pressurized air using the filter includes collecting debris inside the filter; and
the method includes:
ceasing to receive the pressurized air in the conduit via the inlet; and
receiving the debris collected inside the filter into the conduit via the upward flow path and the port.

2. The method as defined in claim 1, comprising, after receiving the debris into the conduit:
resuming to receive the pressurized air in the conduit via the inlet; and
discharging the debris from the conduit via the outlet of the conduit.

3. The method as defined in claim 2, wherein discharging the debris from the conduit via the outlet of the conduit includes entraining the debris out of the conduit using the first portion of the pressurized air.

4. The method as defined in claim 3, wherein the first portion of the pressurized air is greater than the second portion of the pressurized air.

5. The method as defined in claim 1, wherein the upward flow path from the port to the filter consists of a single linear segment.

6. The method as defined in claim 1, wherein the upward flow path from the port to the filter includes two linear segments.

7. The method as defined in claim 1, wherein a general flow direction of the pressurized air in the conduit and a general flow direction of the second portion of the pressurized air along the upward flow path are at an obtuse angle of each other.

8. A gas turbine engine system for filtering pressurized air used to control a compressor bleed valve of a gas turbine engine, the gas turbine engine system comprising:
a first conduit including:
an inlet for receiving the pressurized air;
an outlet for releasing a first portion of the pressurized air from the first conduit; and
a port for releasing a second portion of the pressurized air from the first conduit, the port being disposed between the inlet and the outlet;
a filter for filtering the second portion of the pressurized air, the filter being in fluid communication with the conduit via the port and an upward flow path from the port to the filter; and
a second conduit in fluid communication with the filter and disposed to direct the second portion of the pressurized air from the filter toward the compressor bleed valve,
wherein:
the filter has a cylindrical configuration;
the first conduit is substantially linear and has a longitudinal axis; and
the filter has an axis of revolution oriented obliquely to the longitudinal axis of the first conduit.

9. The gas turbine engine system as defined in claim 8, wherein the upward flow path includes an interior of the filter.

10. The gas turbine engine system as defined in claim 8, wherein the outlet of the first conduit is lower than the inlet of the first conduit.

11. A gas turbine engine comprising:
a compressor for pressurizing air;
a combustor in which the pressurized air is mixed with fuel and ignited for generating a stream of combustion gas;
a turbine for extracting energy from the combustion gas, the compressor, the combustor and the turbine being operatively disposed along a gas path of the gas turbine engine;
a pneumatically-operable compressor bleed valve for bleeding pressurized air from the compressor; and
an orifice pack for controlling an operation of the compressor bleed valve, the orifice pack including:
a first conduit including:
an inlet orifice for receiving a quantity of bleed air extracted from the gas path downstream of the compressor bleed valve and upstream of the combustor, the inlet orifice defining a first constriction;
an outlet orifice for releasing a first portion of the bleed air from the first conduit, the outlet orifice defining a second constriction; and
a port for releasing a second portion of the bleed air from the first conduit, the port being disposed between the inlet orifice and the outlet orifice;
a filter for filtering the second portion of the bleed air, the filter being in fluid communication with the conduit via the port and an upward flow path between the port to the filter; and
a second conduit in fluid communication with the filter and disposed to direct the second portion of the bleed air from the filter toward the compressor bleed valve;
wherein:
the first conduit is substantially linear and has a longitudinal axis; and
the upward flow path is oriented at an obtuse angle to the longitudinal axis of the conduit.

12. The gas turbine engine as defined in claim 11, wherein the filter has a cylindrical configuration.

13. The gas turbine engine as defined in claim 12, wherein the upward flow path includes an interior of the filter.

14. The gas turbine engine as defined in claim 12, wherein the filter has an axis of revolution oriented obliquely to the longitudinal axis of the conduit.

\* \* \* \* \*